(12) United States Patent
Hosoda

(10) Patent No.: US 9,071,708 B2
(45) Date of Patent: Jun. 30, 2015

(54) DEVICE MANAGEMENT APPARATUS AND METHOD GENERATING AREA INFORMATION OF WHERE A DEVICE IS USED BASED ON LOCATION INFORMATION OF A TERMINAL REMOTELY USING THE DEVICE

(75) Inventor: Yasuhiro Hosoda, Yokohama (JP)

(73) Assignee: CANON KABUSHIKI KAISHA, Tokyo ( * ) Notice: Subject to any disclaimer, the term of this patent is extended or adjusted under 35 U.S.C. 154(b) by 291 days.

(21) Appl. No.: 13/592,938

(22) Filed: Aug. 23, 2012

(65) Prior Publication Data

US 2013/0057906 A1 Mar. 7, 2013

(30) Foreign Application Priority Data

Sep. 2, 2011 (JP) ................................ 2011-192033

(51) Int. Cl.
*G06K 15/02* (2006.01)
*H04N 1/00* (2006.01)
*G06F 3/12* (2006.01)
*H04N 1/32* (2006.01)

(52) U.S. Cl.
CPC .......... *H04N 1/00204* (2013.01); *G06F 3/1204* (2013.01); *G06F 3/1229* (2013.01); *G06F 3/1273* (2013.01); *G06F 3/1292* (2013.01); *H04N 2201/3223* (2013.01); *H04N 1/00307* (2013.01); *H04N 1/00344* (2013.01); *H04N 1/32106* (2013.01); *H04N 2201/0094* (2013.01); *H04N 2201/3214* (2013.01); *H04N 2201/3215* (2013.01); *H04N 2201/3202* (2013.01); *H04N 2201/3205* (2013.01); *H04N 2201/3208* (2013.01)

(58) Field of Classification Search
USPC ..................... 358/1.15, 1.13, 1.14, 1.16, 1.2
See application file for complete search history.

(56) References Cited

U.S. PATENT DOCUMENTS

| | | | |
|---|---|---|---|
| 7,880,911 B2 * | 2/2011 | Silverbrook et al. | 358/1.15 |
| 8,199,356 B2 * | 6/2012 | Nakata | 358/1.16 |
| 2007/0070379 A1 * | 3/2007 | Rai et al. | 358/1.13 |
| 2010/0162407 A1 | 6/2010 | Hosoda | |
| 2011/0261405 A1 * | 10/2011 | Ito et al. | 358/1.15 |
| 2012/0262753 A1 * | 10/2012 | Viccari et al. | 358/1.15 |

FOREIGN PATENT DOCUMENTS

| | | |
|---|---|---|
| JP | 2001-92765 | 4/2001 |
| JP | 2002-244831 | 8/2002 |

\* cited by examiner

*Primary Examiner* — Allen H Nguyen
(74) *Attorney, Agent, or Firm* — Fitzpatrick, Cella, Harper & Scinto

(57) ABSTRACT

A device management apparatus which manages a device and a terminal which remotely uses the device, the apparatus comprises a log acquisition unit configured to acquire a log of the device; a usage location specification unit configured to specify a location of the terminal at the time of use of the device based on the log acquired by the log acquisition unit; and a generation unit configured to generate information of an area where the device is used, based on the location of the terminal at the time of use of the device which is specified by the usage location specification unit.

13 Claims, 13 Drawing Sheets

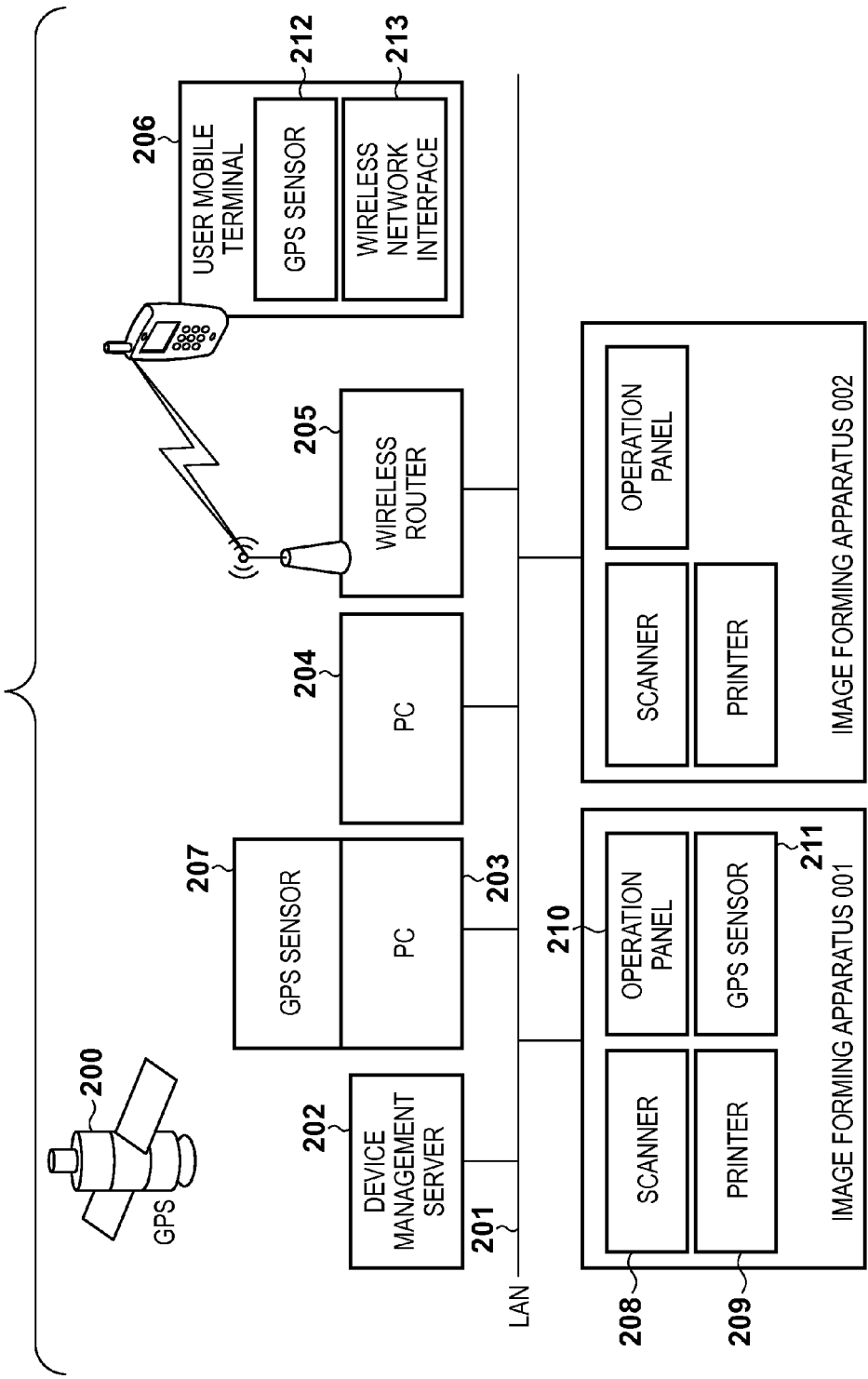

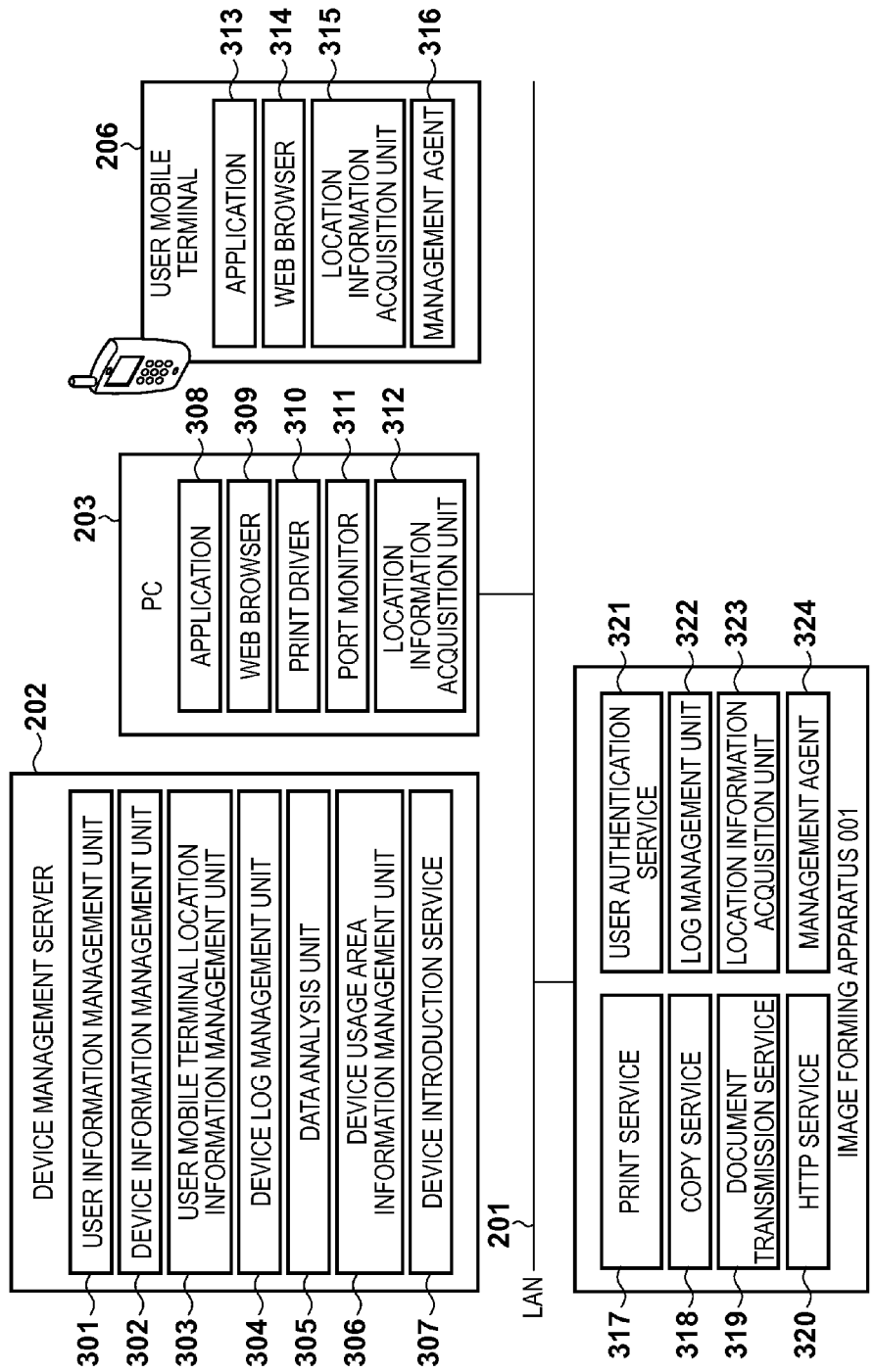

F I G. 4

| ACCOUNT | MOBILE TERMINAL ID |
|---|---|
| Alice | ABC0001 |
| Bob | ABC0002 |
| Carol | ABC0003 |
| Dave | ABC0004 |
| Eve | ABC0005 |
| Ivan | ABC0006 |
| Justin | ABC0007 |
| Mallory | ABC0008 |

F I G. 5

| DEVICE ID | ADDRESS | MODEL | CAPABILITY | LOCATION INFORMATION | | |
|---|---|---|---|---|---|---|
| | | | | LATITUDE | LONGITUDE | ALTITUDE |
| IMAGE FORMING APPARATUS 001 | 172.24.12.100 | NEW-MFP001 | COLOR/MONOCHROME | N35 2145.90 | E138 4350.90 | 37 |
| IMAGE FORMING APPARATUS 002 | 172.24.12.101 | OLD-MFP001 | MONOCHROME | | | |
| IMAGE FORMING APPARATUS 003 | 172.24.12.102 | NEW-MFP001 | COLOR/MONOCHROME | N35 2145.90 | E138 4351.10 | 37 |
| IMAGE FORMING APPARATUS 004 | 172.24.12.103 | NEW-MFP001 | COLOR/MONOCHROME | N35 2145.10 | E138 4351.90 | 37 |

FIG. 6

| MOBILE TERMINAL ID | MOBILE TERMINAL LOCATION INFORMATION | | | |
|---|---|---|---|---|
| | LOCATION MEASUREMENT TIME | LATITUDE | LONGITUDE | ALTITUDE |
| ABC0001 | 9:00:00 | N35 21'45.70 | E138 43'52.90 | 37 |
| ABC0002 | 9:00:00 | N35 21'45.70 | E138 43'52.80 | 37 |
| ABC0003 | 9:00:00 | N35 21'45.40 | E138 43'52.90 | 37 |
| ABC0004 | 9:00:00 | N35 21'45.40 | E138 43'52.80 | 37 |
| ABC0005 | 9:00:00 | N35 21'45.70 | E138 43'53.90 | 37 |
| ABC0006 | 9:00:00 | N35 21'45.70 | E138 43'53.80 | 37 |
| ABC0007 | 9:00:00 | N35 21'45.40 | E138 43'53.90 | 37 |
| ABC0008 | 9:00:00 | N35 21'45.40 | E138 43'53.80 | 30 |
| ABC0001 | 9:05:10 | N35 21'45.80 | E138 43'52.80 | 37 |
| ABC0001 | 9:05:20 | N35 21'45.90 | E138 43'52.70 | 37 |
| ABC0001 | 9:05:30 | N35 21'45.80 | E138 43'52.80 | 37 |
| ABC0001 | 9:05:40 | N35 21'45.70 | E138 43'52.90 | 37 |
| ABC0001 | 9:10:00 | N35 21'45.70 | E138 43'52.90 | 37 |
| ABC0002 | 9:10:00 | N35 21'45.70 | E138 43'52.80 | 37 |
| ABC0003 | 9:10:00 | N35 21'45.40 | E138 43'52.90 | 37 |
| ABC0004 | 9:10:00 | N35 21'45.40 | E138 43'52.80 | 37 |
| ABC0005 | 9:10:00 | N35 21'45.70 | E138 43'53.90 | 37 |
| ABC0006 | 9:10:00 | N35 21'45.70 | E138 43'53.80 | 37 |
| ABC0007 | 9:10:00 | N35 21'45.40 | E138 43'53.90 | 37 |
| ABC0008 | 9:10:00 | N35 21'45.40 | E138 43'53.80 | 30 |
| ABC0002 | 9:15:10 | N35 21'45.80 | E138 43'52.80 | 37 |
| ABC0002 | 9:15:10 | N35 21'45.90 | E138 43'52.70 | 37 |
| ABC0002 | 9:15:10 | N35 21'45.80 | E138 43'52.70 | 37 |
| ABC0002 | 9:15:00 | N35 21'45.90 | E138 43'52.80 | 37 |
| ABC0002 | 9:15:00 | N35 21'45.70 | E138 43'52.90 | 37 |
| ABC0001 | 9:20:00 | N35 21'45.70 | E138 43'52.90 | 37 |
| ABC0002 | 9:20:00 | N35 21'45.70 | E138 43'52.80 | 37 |
| ABC0003 | 9:20:00 | N35 21'45.40 | E138 43'52.90 | 37 |
| ABC0004 | 9:20:00 | N35 21'45.40 | E138 43'52.80 | 37 |
| ABC0005 | 9:20:00 | N35 21'45.70 | E138 43'53.90 | 37 |
| ABC0006 | 9:20:00 | N35 21'45.70 | E138 43'53.80 | 37 |
| ABC0007 | 9:20:00 | N35 21'45.40 | E138 43'53.90 | 37 |
| ABC0008 | 9:20:00 | N35 21'45.40 | E138 43'53.80 | 30 |
| | | | | |

FIG. 7A

| DEVICE ID | RECEPTION TIME | COMPLETION TIME | JOB INFORMATION ||||
|---|---|---|---|---|---|---|
| | | | ACCOUNT | JOB GENERATION TIME | TERMINAL INFORMATION | TERMINAL LOCATION INFORMATION |
| IMAGE FORMING APPARATUS 001 | 9:00:02 | 9:00:05 | Alice | 9:00:01 | PC203 | LATITUDE = N35 21'45.60 LONGITUDE = E138 43'52.90 ALTITUDE = 37 LOCATION MEASUREMENT TIME = 9:00:00 |
| IMAGE FORMING APPARATUS 001 | 9:05:02 | 9:05:05 | Bob | 9:05:01 | PC204 | |
| IMAGE FORMING APPARATUS 002 | 9:10:02 | 9:10:05 | Carol | 9:10:01 | PCXXX | LATITUDE = N35 21'45.40 LONGITUDE = E138 43'52.90 ALTITUDE = 37 LOCATION MEASUREMENT TIME = 9:00:00 |

FIG. 7B

| DEVICE ID | TYPE | EXECUTION TIME | ACCOUNT | JOB INFORMATION |
|---|---|---|---|---|
| IMAGE FORMING APPARATUS 001 | REMOTE LOGIN | 10:00:00 | Alice | LATITUDE = N35 21'45.60 LONGITUDE = E138 43'52.90 ALTITUDE = 37 LOCATION MEASUREMENT TIME = 10:00:01 |
| IMAGE FORMING APPARATUS 001 | REMOTE LOGIN | 10:05:00 | Bob | |
| IMAGE FORMING APPARATUS 002 | REMOTE LOGIN | 10:10:00 | Carol | LATITUDE = N35 21'45.40 LONGITUDE = E138 43'52.90 ALTITUDE = 37 LOCATION MEASUREMENT TIME = 10:10:01 |

FIG. 7C

| DEVICE ID | TYPE | EXECUTION TIME | ACCOUNT | JOB INFORMATION |
|---|---|---|---|---|
| IMAGE FORMING APPARATUS 001 | WEB DIRECT PRINT | 10:02:00 | Alice | LATITUDE = N35 21'45.60  ALTITUDE = 37 LONGITUDE = E138 43'52.90 LOCATION MEASUREMENT TIME = 10:02:01 |
| IMAGE FORMING APPARATUS 001 | WEB DIRECT PRINT | 10:07:00 | Bob | |
| IMAGE FORMING APPARATUS 002 | WEB DIRECT PRINT | 10:12:00 | Carol | LATITUDE = N35 21'45.40  ALTITUDE = 37 LONGITUDE = E138 43'52.90 LOCATION MEASUREMENT TIME = 10:12:01 |

FIG. 7D

| DEVICE ID | TYPE | EXECUTION TIME | ACCOUNT |
|---|---|---|---|
| IMAGE FORMING APPARATUS 001 | LOCAL LOGIN | 11:00:00 | Alice |
| IMAGE FORMING APPARATUS 001 | LOCAL LOGIN | 11:05:00 | Bob |
| IMAGE FORMING APPARATUS 002 | LOCAL LOGIN | 11:10:00 | Carol |

FIG. 7E

| DEVICE ID | TYPE | OPERATION TIME | ACCOUNT |
|---|---|---|---|
| IMAGE FORMING APPARATUS 001 | COPY | 11:01:00 | Alice |
| IMAGE FORMING APPARATUS 001 | DOCUMENT TRANSMISSION | 11:06:00 | Bob |
| IMAGE FORMING APPARATUS 002 | SETTING CHANGE | 11:11:00 | Carol |

F I G. 8A

| AREA ID | LATITUDE | LONGITUDE | ALTITUDE(m) |
|---|---|---|---|
| AREA A | N35 21'45.50~46.00 | E138 43'52.00~53.00 | 36~38 |
| AREA B | N35 21'45.00~46.50 | E138 43'52.00~53.00 | 36~38 |
| AREA C | N35 21'45.50~46.00 | E138 43'53.00~54.00 | 36~38 |
| AREA D | N35 21'45.00~46.50 | E138 43'53.50~54.00 | 36~38 |

F I G. 8B

| DEVICE ID | AREA PRIORITY | AREA ID |
|---|---|---|
| IMAGE FORMING APPARATUS 001 | FIRST USAGE AREA | AREA A |
|  | SECOND USAGE AREA | AREA B |
|  | THIRD USAGE AREA | AREA C , AREA D |
| IMAGE FORMING APPARATUS 002 | FIRST USAGE AREA | AREA B |
|  | SECOND USAGE AREA | AREA A |
|  | THIRD USAGE AREA | AREA C , AREA D |
| IMAGE FORMING APPARATUS 003 | FIRST USAGE AREA | AREA C |
|  | SECOND USAGE AREA | AREA D |
|  | THIRD USAGE AREA | AREA A , AREA B |
| IMAGE FORMING APPARATUS 004 | FIRST USAGE AREA | AREA D |
|  | SECOND USAGE AREA | AREA C |
|  | THIRD USAGE AREA | AREA A , AREA B |

FIG. 9

| | ITEM | | | | VALUE |
|---|---|---|---|---|---|
| JOB HEADER | ACCOUNT | | | | Alice |
| | JOB GENERATION TIME | | | | 9:00:10 |
| | PRINT SETTING | | | | COLOR·2up |
| | TERMINAL INFORMATION | TERMINAL ID | | | PERSONAL COMPUTER |
| | | ADDRESS | | | 172.24.12.xxx |
| | | LOCATION INFORMATION | LATITUDE | | N35 21'45.80 |
| | | | LONGITUDE | | E138 43'50.90 |
| | | | ALTITUDE | | 37 |
| | | | LOCATION MEASUREMENT TIME | | 9:00:10 |
| JOB DATA | IMAGE DATA | | | | |

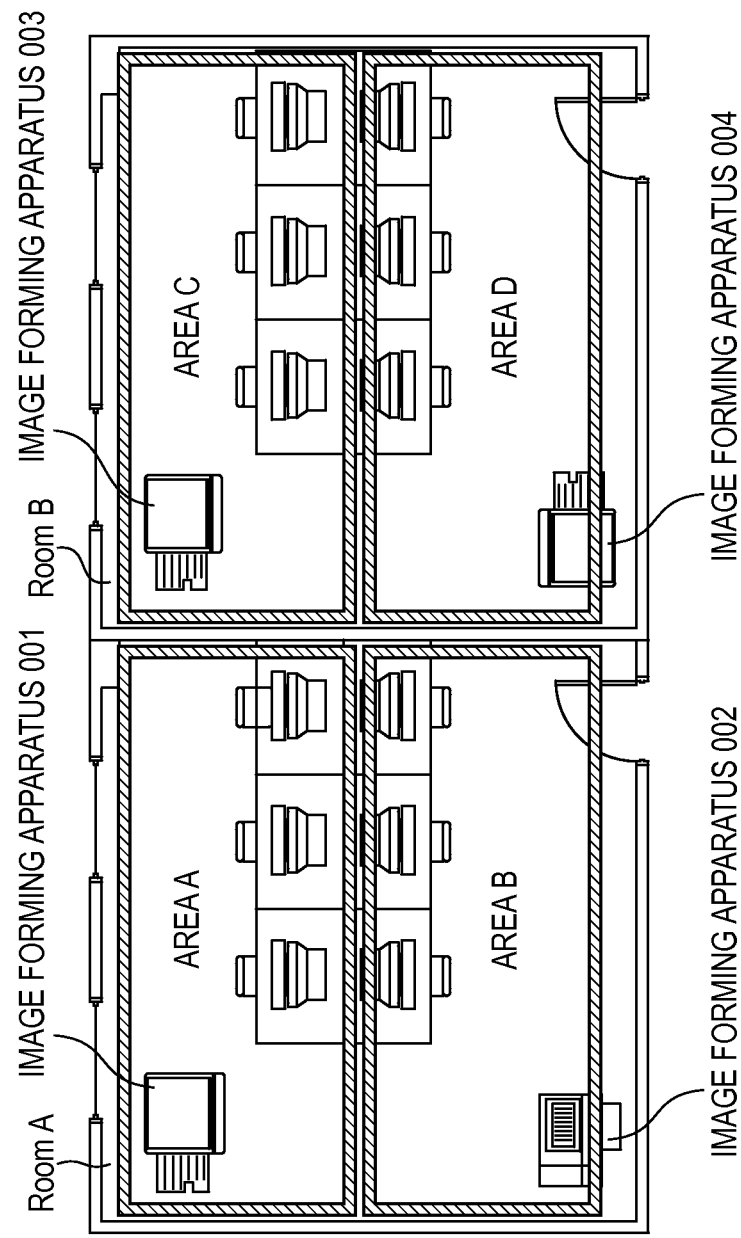
F I G. 10A

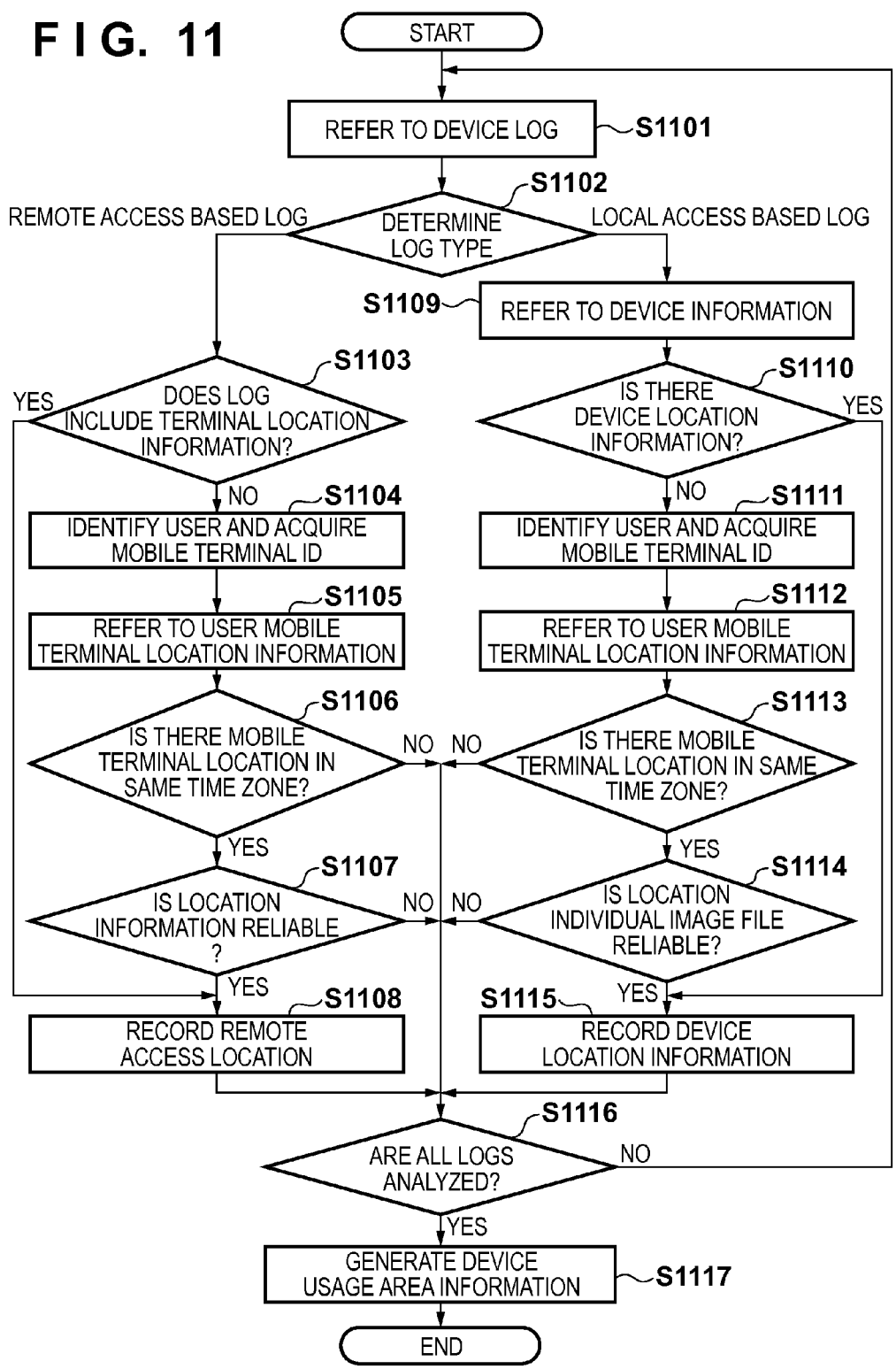

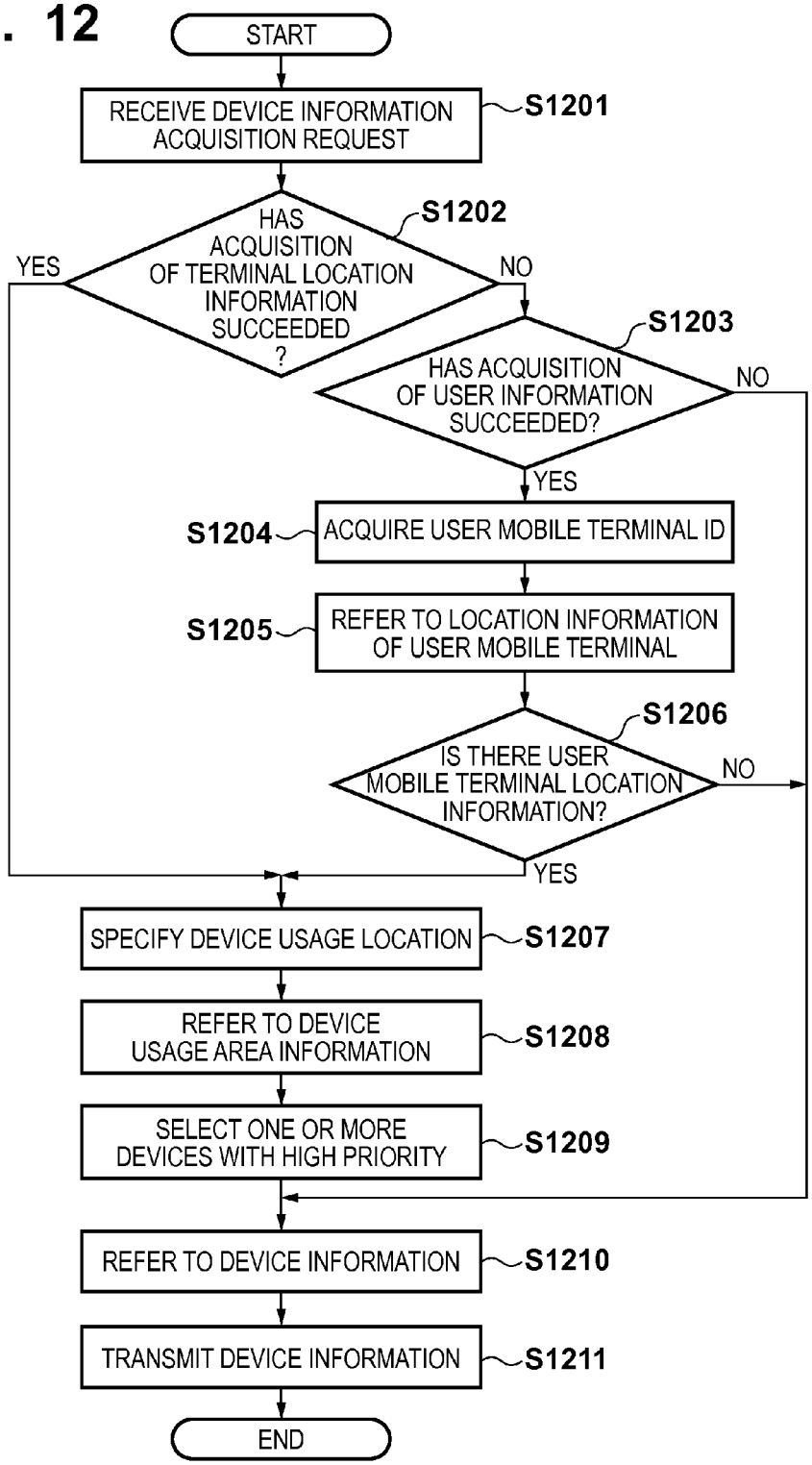

DEVICE MANAGEMENT APPARATUS AND METHOD GENERATING AREA INFORMATION OF WHERE A DEVICE IS USED BASED ON LOCATION INFORMATION OF A TERMINAL REMOTELY USING THE DEVICE

BACKGROUND OF THE INVENTION

1. Field of the Invention

The present invention relates to a device management apparatus, a device management method, and a computer-readable medium and, more particularly, to a management method for devices which are used from terminals in remote places.

2. Description of the Related Art

Conventional device management methods include a device management method which facilitates the management of the locations of devices in, for example, an office by managing the location information of each device with a hierarchical structure (for example, Japanese Patent Laid-Open No. 2001-92765).

Some conventional image forming system is configured such that when a user uses an image forming apparatus from a mobile terminal having a GPS (Global Positioning System) or PHS (Personal Handy-phone System) function, the system searches for an image forming nearest to the mobile terminal by using the location information of each image forming apparatus (for example, Japanese Patent Laid-Open No. 2002-244831).

In general, in a large office in which a plurality of devices, such as multifunction peripherals and printers, are installed, a manager assumes areas in an office as areas where the respective devices are to be used, and then determines the installation locations of the devices so as to avoid inconvenience such as having no devices in some area. However, there is available no means for checking whether the respective devices in the respective areas are used as assumed by the manager. This raises a problem that the manager cannot change the locations of devices in consideration of the utilization situations of the devices.

It is often the case that a user who performs print output on a device from a terminal such as a PC (Personal Computer) searches for a device in the same area and uses it. In such a case, if the manager generates data associating areas in an office with devices in advance, a user can easily find a device in the same area by using the generated data.

However, it is very troublesome for the manager to generate data for associating the areas in the office with the devices. Even if the manager uses a device management unit like that disclosed in Japanese Patent Laid-Open No. 2001-92765, he/she needs to register the locations of the devices and area information associated with the devices by using a tool. For example, as disclosed in Japanese Patent Laid-Open No. 2002-244831, there has also been proposed a method of finding a device in the same area by using the location information obtained from a GPS sensor. A physical obstacle such as a wall or desk sometimes exists between a terminal and a device. If, therefore, this system searches for a device nearest to the terminal by using only the linear distance of the location information acquired from the GPS sensor installed in the terminal or each device, the system may notify the user of a device in a wrong area.

SUMMARY OF THE INVENTION

The present invention has been made in consideration of the above problem, and proposes a technique of generating the information of each area in which each device is used, based on the use records of the respective devices.

According to one aspect of the present invention, there is provided a device management apparatus which manages a device and a terminal which remotely uses the device, the apparatus comprising: a log acquisition unit configured to acquire a log of the device; a usage location specification unit configured to specify a location of the terminal at the time of use of the device based on the log acquired by the log acquisition unit; and a generation unit configured to generate information of an area where the device is used, based on the location of the terminal at the time of use of the device which is specified by the usage location specification unit.

According to another aspect of the present invention, there is provided a device management method of managing a device and a terminal which remotely uses the device, the method comprising the steps of: acquiring a log of the device; specifying a location of the terminal at the time of use of the device based on the log acquired in the acquisition step; and generating information of an area where the device is used, based on the location of the terminal at the time of use of the device which is specified in the specification step.

According to another aspect of the present invention, there is provided a computer-readable medium storing a program for causing a computer to function as a log acquisition unit configured to acquire a log of a device; a usage location specification unit configured to specify a location of the terminal at the time of use of the device based on the log acquired by the log acquisition unit; and a generation unit configured to generate information of an area where the device is used, based on the location of the terminal at the time of use of the device which is specified by the usage location specification unit.

According to the present invention, it is easy to manage the respective installed devices by generating the information of each area in which each device is used, based on the data acquired by the device management apparatus.

Further features of the present invention will become apparent from the following description of exemplary embodiments (with reference to the attached drawings).

BRIEF DESCRIPTION OF THE DRAWINGS

FIG. 2 is a block diagram showing a network configuration and the hardware configuration of a terminal connected to the network;

FIG. 3 is a block diagram showing the typical software configuration of the terminal connected to the network;

FIG. 4 is a view showing user information managed by a user information management unit;

FIG. 5 is a view showing device information managed by a device information management unit;

FIG. 6 is a view showing the log of user mobile terminal locations which a user mobile terminal location information management unit has;

FIGS. 7A, 7B, 7C, 7D, and 7E are views each showing a device log which a device log management unit has;

FIGS. 8A and 8B are views showing device usage area information managed by a device usage area information management unit;

FIG. 9 is a view showing print job data;

FIGS. 10A and 10B are views each diagrammatically showing the analysis result obtained by a data analysis unit;

FIG. 11 is a flowchart showing device usage area information generation processing by the data analysis unit; and FIG. 12 is a flowchart showing device introduction service processing.

DESCRIPTION OF THE EMBODIMENTS

The best mode for carrying out the present invention will be described below with reference to the accompanying drawings. This embodiment will exemplify image forming apparatuses as devices. Note that the devices may be multifunction peripherals and scanners as long as they are apparatuses to be used in the same manner.

First Embodiment

Figure 1:
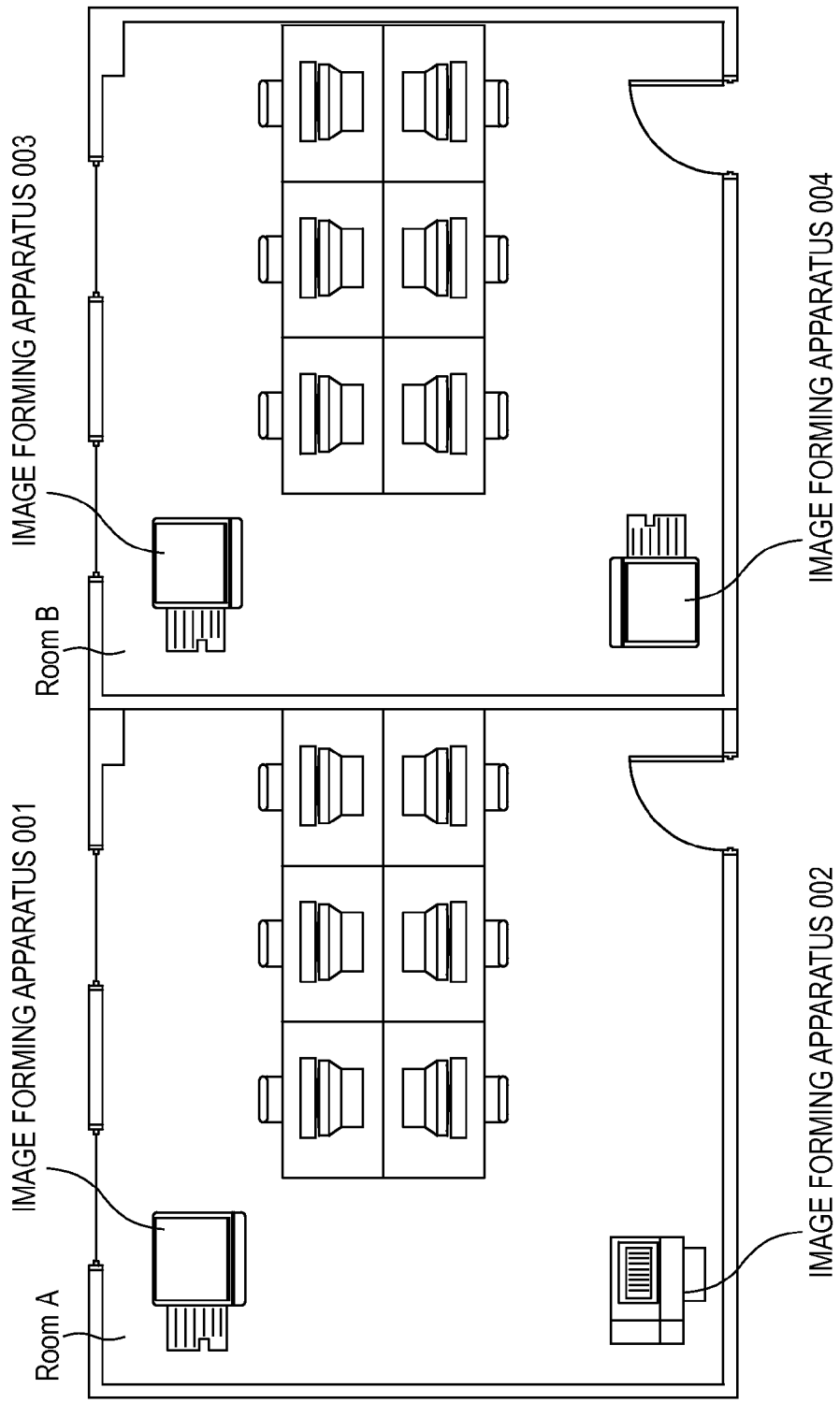
FIG. 1 is a view showing a physical office layout.

FIG. 1 shows an example of the physical layout of an office environment according to this embodiment. Image forming apparatuses 001 and 002 are installed in Room A. Image forming apparatuses 003 and 004 are installed in Room B. There is a wall between Room A and Room B. This wall does not allow people to pass through. Assume that a building in which the office is tenanted includes other rooms and other floors (not shown). Assume also that each user who uses the office in this embodiment has a mobile terminal, and it is possible to always obtain the location information of a user by using a GPS function or the like which the mobile terminal has.

<Network & Hardware Configuration>

FIG. 2 is a schematic view showing a network configuration and a hardware configuration according to this embodiment. A device management server 202, a PC 203, a PC 204, and the image forming apparatuses 001 to 004 are connected to a network (LAN 201) in the office to allow them to communicate with each other. In addition, a user mobile terminal 206 includes a wireless network interface to allow these components to connect to the LAN 201 via a wireless router 205.

The user mobile terminal 206 includes a GPS sensor 212 which transmits and receives signals to and from a GPS 200. The user mobile terminal 206 also includes a wireless network interface 213, and can communicate with a terminal connected to the LAN 201 via the wireless router 205. In addition, the user mobile terminal 206 includes components (a CPU, a memory, and the like) as those of a general-purpose mobile terminal. An illustration of them is however omitted in FIG. 2.

The PCs 203 and 204 and the device management server 202 each can be implemented by the configuration of a general-purpose computer. The PC 203 is an example of a PC including a built-in or external GPS sensor 207. This allows the PC 203 to transmit and receive signals to and from the GPS 200. The PC 204 is an example of a PC including no GPS sensor.

Each of the image forming apparatuses 001 to 004 includes hardware such as a scanner 208, a printer 209, and an operation panel 210 in addition to the components (CPU, memory, storage, and network interface: not shown) of the general-purpose computer. The image forming apparatus 001 exemplifies an image forming apparatus including a GPS sensor 211. This allows the image forming apparatus 001 can transmit and receive signals to and from the GPS 200. The image forming apparatus 002 is an example of an image forming apparatus including no GPS sensor. Assume that referring to FIG. 2, the image forming apparatuses 003 and 004 each include the same hardware configuration as that of the image forming apparatus 001.

The user mobile terminal 206 periodically acquires its location information from the GPS 200 by using the GPS sensor 212. The acquired location information is transmitted to the device management server 202 connected via the network. The user mobile terminal 206 also includes applications and Web browser (not shown), and can use the services provided by the device management server 202 and each image forming apparatus via the applications and Web browser.

<Software Configuration>

FIG. 3 is a schematic view of a main software configuration (each processing unit implemented by software) according to this embodiment. Assume that in the embodiment, each computer functions as each processing unit in FIG. 3 by executing a program. Each processing unit may be implemented by one program or a combination of a plurality of programs. Various kinds of information used by each apparatus will be described later with reference to the accompanying drawings.

[Software Configuration of Device Management Server 202]

The software configuration of the device management server 202 will be described first. A user information management unit 301 manages the user information (FIG. 4) of each employee who uses the office. The user information management unit 301 stores and manages the user information registered in advance by the manager in a storage (not shown). A device information management unit 302 stores and manages image forming apparatus information (FIG. 5) in the storage. A user mobile terminal location information management unit 303 stores and manages the user mobile terminal location information (FIG. 6) received from a plurality of user mobile terminals.

A device log management unit 304 periodically acquires device logs (FIGS. 7A to 7E) from a plurality of image forming apparatuses, and then stores and manages the acquired device logs in the storage. A data analysis unit 305 analyzes user information (FIG. 4), image forming apparatus information (FIG. 5), user mobile terminal location information (FIG. 6), and device logs (FIGS. 7A to 7E), and generates device usage area information (FIGS. 8A and 8B). Device usage area information is information indicating specific areas from which the respective devices can be used. A concrete method of generating such information will be described later.

A device usage area information management unit 306 stores and manages the device usage area information (FIGS. 8A and 8B) generated by the data analysis unit 305. The device usage area information management unit 306 includes a function of displaying a user interface for allowing the user to browse generated device usage area information. The device usage area information management unit 306 may be configured to externally receive two-dimensional data (office map) indicating an office layout or three-dimensional of a building, combine the information with generated device usage area information, and display the resultant information on the user interface.

A device introduction service 307 is for returning device information in response to a device information request from the user mobile terminal 206 or the PC 203.

[Software Configuration of PC]

The PC 203 includes an application 308, a Web browser 309, a print driver 310, a port monitor 311, and a location information acquisition unit 312. The location information acquisition unit 312 acquires the location information of the PC 203 from the GPS sensor 207. The user of the PC 203 can transmit a print job (FIG. 9) to each image forming apparatus by using the application 308 or the print driver 310. The Web browser 309 to be used is a general-purpose browser, and is not specifically limited.

The header of the print jot transmitted to an image forming apparatus can include terminal information and the location information acquired from the location information acquisition unit 312 in addition to an account at the time of PC login, a job generation time, and a print setting, as shown in FIG. 9. Note that the PC 204 includes no GPS sensor, and hence cannot acquire location information from the location information acquisition unit 312. For this reason, the print job transmitted from the PC 204 cannot include any location information.

[Software Configuration of User Mobile Terminal 206]

The user mobile terminal 206 includes an application 313, a Web browser 314, a location information acquisition unit 315, and a management agent 316. The application 313 can transmit a print job (FIG. 9) to an image forming apparatus. The location information acquisition unit 315 performs location measurement at a period of 1 sec to obtain the location information of the user mobile terminal 206 by using the GPS sensor 212. Note that the location measurement period of location information is not limited to this. Upon detecting a change in location information, the management agent 316 transmits the location information to the device management server 202. The management agent 316 is configured to transmit location information to the device management server 202 at a period of 10 min even if there is no change in location information. Note that the transmission period of location information is not limited to this.

[Software Configuration of Image Forming Apparatus]

The image forming apparatus 001 includes a software configuration including a print service 317, a copy service 318, a document transmission service 319, an HTTP service 320, a user authentication service 321, a log management unit 322, a location information acquisition unit 323, and a management agent 324. The print service 317 is for receiving a print job like that shown in FIG. 9 from the PC 203 or the user mobile terminal 206 and performing printing by using the printer 209. The copy service 318 is for performing copying operation by using the scanner 208 and the printer 209 in response to a copy instruction from the operation panel 210.

The document transmission service 319 is for accepting document transmission operation via the operation panel 210, scanning a document written on a sheet or the like by using the scanner 208, converting the document into electronic data, and transmitting the data to the address designated by the user. The HTTP service 320 is for releasing the Website written in HTML (Hyper Text Markup Language) provided by the image forming apparatus 001. The image forming apparatus 001 also includes a Web direct print function of printing the electronic document uploaded to a Website. The user can use the Website provided by the image forming apparatus 001 by accessing from the Web browser 309 of the PC 203 or the Web browser 314 of the user mobile terminal 206.

The user mobile terminal 206 may be configured to acquire the location information of the PC 203 from the Web browser 309 of the PC 203 in the Website provided by an image forming apparatus by using location information acquisition API (Application Program Interface) embedded in the corresponding HTML data. Likewise, the user mobile terminal 206 can be configured to acquire the location information of the user mobile terminal 206 from the Web browser 314 of the user mobile terminal 206. As techniques which can implement this, for example, Client Location API available from Google Inc., HTML5, and Geolocation API defined by W3C are known.

The user authentication service 321 is for authenticating the user who accesses the operation panel 210 or the HTTP service 320 by using an IC card or an account and password. The log management unit 322 records and manages the logs acquired by the image forming apparatus 001 in the storage. The location information acquisition unit 323 acquires the location information of the image forming apparatus 001 from the GPS 200 via the GPS sensor 211.

The management agent 324 periodically transmits image forming apparatus information (a device ID, network address, model information, capability information, and location information) like that shown in FIG. 5 and the log acquired from the log management unit 322 to the device management server 202. The management agent 324 may be configured to transmit image forming apparatus information immediately after the device is activated. The management agent 324 may also be configured to transmit a log to the device management server 202 when a predetermined amount of log information is accumulated in the storage.

The image forming apparatus 002 has no GPS sensor, and hence cannot acquire location information acquired by the location information acquisition unit. Therefore, the image forming apparatus information transmitted by the image forming apparatus 002 includes no location information.

<Management Information>

The information managed by the device management server 202 according to this embodiment will be described next with reference to FIGS. 4 to 8B. Note that the arrangement of each kind of information described below is merely an example, and may be configured to include other kinds of information.

[User Information]

FIG. 4 shows an example of the arrangement of user information. In user information, pieces of information of accounts and identifiers (mobile terminal IDs) of user mobile terminals, with which the users log in to PCs or image forming apparatuses, are associated with each other. A mobile terminal ID is information for uniquely identifying each user mobile terminal. In addition, accounts and mobile terminal IDs need not always have a one-to-one relationship.

[Device Information]

FIG. 5 shows an example of the arrangement of device information. Device information includes the IDs, network addresses, model information, capability information, and location information of devices (image forming apparatuses, in this case). The device management server 202 acquires these pieces of information from an image forming apparatus via a network. In addition, device information may be configured to be directly registered/changed by the manager using a tool.

Note that the image forming apparatus 002 includes no GPS sensor, and hence cannot acquire location information from the image forming apparatus 002. The device information of the image forming apparatus 002 generally includes no location information. If, however, the user sets location information in advance, the set information may be used.

[Location Information of User Mobile Terminal]

FIG. 6 shows an example of the arrangement of user mobile terminal location information. User mobile terminal location information includes the mobile terminal ID and mobile terminal location information received from the user mobile terminal 206. The mobile terminal location information includes the location measurement time at which the GPS 200 performed location measurement.

As described above, in this embodiment, a log of receiving location information from all the user mobile terminals 206 in the office is recorded once per 10 min. In addition, a log of receiving location information from the user mobile terminal 206 in motion (that is, whose location is changing) at intervals of 1 sec or more.

[Device Log]

FIGS. 7A to 7E each show an example of the arrangement of a device log. FIG. 7A shows a log of print jobs executed by image forming apparatuses. The device management server 202 acquires this print job log from the image forming apparatuses. A print job log includes device IDs, job reception times, job completion times, and the job information (accounts, job generation times, terminal information, and terminal location information) acquired from the job headers of the print jobs. Note, however, that the PC 204 includes no GPS sensor, and hence the print job issued by the PC 204 includes no terminal location information.

FIG. 7B shows an authentication log at the time of remote access (remote login) to each image forming apparatus. The device management server 202 acquires this authentication log from the image forming apparatus. More specifically, this is an authentication log of user authentication (login) at the time of access to the HTTP service of each image forming apparatus from the PC 203 or the user mobile terminal 206. An authentication log includes device IDs, operation types, execution times, the accounts of login users, and the terminal location information which the HTTP service has acquired from the Web browsers of the terminals. Note however that the PC 204 includes no GPS sensor, and hence cannot acquire the location information of a terminal from the Web browser of the PC 204. Assume therefore that a log of HTTP service access from the PC 204 includes no terminal location information.

FIG. 7C shows a log recorded at the time of the use of the Web direct print function provided by each image forming apparatus. The device management server 202 acquires this log from each image forming apparatus. A log includes device IDs, operation types, operation times, the accounts of users who have logged in, and the terminal location information which the HTTP service has acquired from Web browsers. Note however that, for example, the PC 204 includes no GPS sensor, and hence cannot acquire terminal location information from a Web browser. Assume therefore that a log recorded at the time of HTTP service access from the PC 204 includes no terminal location information.

FIG. 7D shows an authentication log recorded at the time of access (local login) via the operation panel of each image forming apparatus. The device management server 202 acquires this authentication log from each image forming apparatus. An authentication log includes device IDs, types, execution times, and the accounts of login users.

FIG. 7E shows a log recorded when each image forming apparatus is operated via the operation panel of the image forming apparatus. The device management server 202 acquires this log from each image forming apparatus. This log includes device IDs, types (copy, document transmission, setting change, and the like), operation times, and the accounts of users who have operated.

[Device Usage Area Information]

FIGS. 8A and 8B each show the device usage area information generated by the device management server 202. Device usage area information is information indicating specific areas from which the respective devices can be used in correspondence with their priority levels.

FIG. 8A shows area classification in the office. Area information includes area IDs and area information expressed by three-dimensional information (latitudes, longitudes, and altitudes). This embodiment will be described with reference to a case in which the device management server 202 has automatically classified the respective areas into area A, area B, area C, and area D, as shown in FIG. 10A.

FIG. 8B shows information for managing the respective image forming apparatuses and the areas in association with each other. For example, the device management server 202 associates the area IDs of areas where users frequently use the respective image forming apparatuses with the device IDs of the image forming apparatuses. It is possible to associate a plurality of area IDs with each device ID, and the respective areas are expressed as the first, second, and third usage areas in descending order of frequent usage for each device.

<Device Usage Area Information Generation Processing>

There will be described, with reference to the flowchart of FIG. 11, the processing in which the device management server 202 according to the present invention generates device usage area information (FIGS. 8A and 8B) based on user information (FIG. 4), device information (FIG. 5), user mobile terminal location information (FIG. 6), and device logs (FIG. 7). Assume that the CPU of the device management server 202 implements this processing by reading out and executing a program stored in a ROM or the like.

The data analysis unit 305 of the device management server 202 periodically (for example, once per day) starts this processing. When a predetermined amount of device log information and user mobile terminal location information is accumulated in the storage, the data analysis unit 305 may start the processing.

Upon starting the processing, the data analysis unit 305 sequentially refers to the respective logs shown in FIGS. 7A to 7E managed by the device log management unit 304 (step S1101). The data analysis unit 305 determines the types of logs to which it has referred (S1102). In this embodiment, the data analysis unit 305 processes a print log (FIG. 7A), remote access authentication log (FIG. 7B), and log at the time of the use of Web direct print (FIG. 7C) as remote access based logs. On the other hand, the data analysis unit 305 processes an authentication log at the time of operation panel access (FIG. 7D) and log at the time of operation panel operation (FIG. 7E) as local access based logs. Upon determining that the referred device logs are remote access based logs, the data analysis unit 305 performs the processing after step S1103. Upon determining that the referred logs are local access based logs, the data analysis unit 305 performs the processing after step S1109.

Data analysis processing common to remote access based logs will be described first. The data analysis unit 305 checks whether the log includes the terminal location information of the PC or user mobile terminal (step S1103). If the log includes the terminal location information (YES in step S1103), the data analysis unit 305 determines the location information as the location of remote access (remote access location) at the terminal (step S1108). If the log includes no terminal location information (NO in step S1103), the data analysis unit 305 identifies the user from the account of the user included in the log by referring to the user information (FIG. 4). The data analysis unit 305 further acquires the mobile terminal ID associated with the account (step S1104).

The data analysis unit 305 then refers to the location information (FIG. 6) of the user mobile terminal associated with the acquired mobile terminal ID (step S1105). The data analysis unit 305 then determines whether there is user mobile terminal location information in the same time zone as that of the time data included in the log under analysis (step S1106). If there is no user mobile terminal location information in the same time zone (NO in step S1106), the process advances to step S1116. Note that the same time zone indicates a time zone before and after an analysis target time within a predetermined range. The data analysis unit 305 therefore searches for user mobile terminal location information corresponding to the location measurement time nearest to the analysis target time. With regard to "within a predetermined range, if, for example, a threshold is set to 10 min, the data analysis unit 305 can be configured not to detect location information before and after the threshold.

If there is user mobile terminal location information (YES in step S1106), the data analysis unit 305 further determines whether the location information is reliable (step S1107). More specifically, when the user has forgotten to take his/her mobile terminal and left it in a bag or on a desk, the location information of the user mobile terminal is not reliable location information (remote access location). It is therefore necessary to exclude these data.

For example, user mobile terminal location information which satisfies any one of the following conditions is not reliable as a remote access location, and hence is excluded. During determination processing, the data analysis unit 305 refers to device information (FIG. 5) and user mobile terminal location information (FIG. 6), as needed. Note that the following conditions are merely an example, and other conditions may be used. In addition, it is not always necessary to use the following conditions.

When user mobile terminal location information is compared with device location information, the linear distance between them exceeds a threshold.

When user mobile terminal location information is compared with device location information, the height distance exceeds a threshold. In this case, the data analysis unit 305 determines that the user mobile terminal and the device are located on different floors in the building.

User mobile terminal location information includes no record based on which the data analysis unit 305 can determine that the user mobile terminal has moved at the log recording time and in a predetermined period before and after the recording time.

User mobile terminal location information includes no record that makes the data analysis unit 305 know that the user has approached a device in a predetermined period after print instruction issuing operation to pick up a printed document at the location of the device.

Upon determining that the user mobile terminal location information satisfies none of the above conditions and hence is reliable (YES in step S1107), the data analysis unit 305 determines and stores the user mobile terminal location information acquired in step S1106 as a remote access location (step S1108). With this operation, the device management server 202 specifies a usage location. If there is no user mobile terminal location information (NO in step S1106), or the user mobile terminal location information is not reliable (NO in step S1107), the data analysis unit 305 skips analysis of the device log under analysis, and continues analysis of another device log.

In the determination processing performed in step S1107 to determine whether the location information is reliable, the data analysis unit 305 may determine the magnitude of reliability and store a remote access location together with information indicating the reliability.

Data analysis processing common to local access based logs will be described next. The data analysis unit 305 refers to device information (FIG. 5) (step S1109). The data analysis unit 305 then determines whether the device information includes the location information of the device from which the log under analysis has been acquired (step S1112). If the device information includes the location information of the device (YES in step S1110), the data analysis unit 305 stores the location information of the device (step S1115).

If the device information includes no device location information (NO in step S1110), the data analysis unit 305 refers to user information (FIG. 4) and identifies the user from the user account included in the log. The data analysis unit 305 further acquires the mobile terminal ID associated with the account from the user information (step S1111).

The data analysis unit 305 refers to the user mobile terminal location information (FIG. 6) associated with the acquired mobile terminal ID (step S1112). The data analysis unit 305 determines whether there is user mobile terminal location information in the same time zone as that of the time data included in the log under analysis (step S1113). If there is no user mobile terminal location information in the same time zone (NO in step S1113), the process advances to step S1116. The same time zone in this case indicates a time zone before and after the time of an analysis target within a predetermined range. The data analysis unit 305 searches for the user mobile terminal location information nearest from the analysis target time in terms of location measurement time. With regard to "within a predetermined range, if, for example, a threshold is set to 10 sec, the data analysis unit 305 can be configured not to detect location information before and after the threshold.

If there is user mobile terminal location information (YES in step S1113), the data analysis unit 305 further determines whether the location information is reliable (step S1114). More specifically, when the user has forgotten to take his/her mobile terminal and left it in a bag or on a desk, the location information of the user mobile terminal is not reliable location information. It is therefore necessary to exclude these data.

For example, user mobile terminal location information which satisfies any one of the following conditions is not reliable as a device location, and hence is excluded. Note that the following conditions are merely an example, and other conditions may be used. In addition, it is not always necessary to use the following conditions. Assume also that the thresholds to be used in the conditions are defined in advance.

User mobile terminal location includes no record based on which the data analysis unit 305 can determine that the user mobile terminal has moved at the log recording time and in a predetermined period before and after the recording time.

When user mobile terminal locations are obtained from all the local access based logs of the same device, the distance of acquired user mobile terminal location information from the barycenter of the distribution exceeds a threshold.

The number of samples of user mobile terminal locations obtained from all the local access based logs of the same device is smaller than a threshold.

Upon determining that the user mobile terminal location information satisfies none of the above conditions and hence is reliable (YES in step S1114), the data analysis unit 305 stores the user mobile terminal location information acquired in step S1113 as a device location (step S1115). With this operation, the device management server 202 specifies a device location. In this case, the device management server 202 may be configured to update the device location information of the device information (FIG. 5). If there is no user mobile terminal location information (NO in step S1113), or the user mobile terminal location information is not reliable (NO in step S1114), the data analysis unit 305 skips analysis of the device log under analysis, and continues analysis of another device log.

If the number of samples is too small to determine in step S1114 that the user mobile terminal location information is the device location, the data analysis unit 305 may be configured to temporarily store the user mobile terminal location information and continue analyzing other device logs until the number of samples exceeds the threshold.

The data analysis unit 305 performs analysis processing of device logs in steps S1102 to S1115 until there is no device log which is not analyzed. If there is no device log which is not analyzed (YES in step S1116), the data analysis unit 305 performs generation processing of device usage area information (FIGS. 8A and 8B) (step S1117). In step S1117, the data analysis unit 305 refers to a plurality of remote access locations stored in association with devices in step S1108 and the device location information stored in step S1115.

Figure 10B:
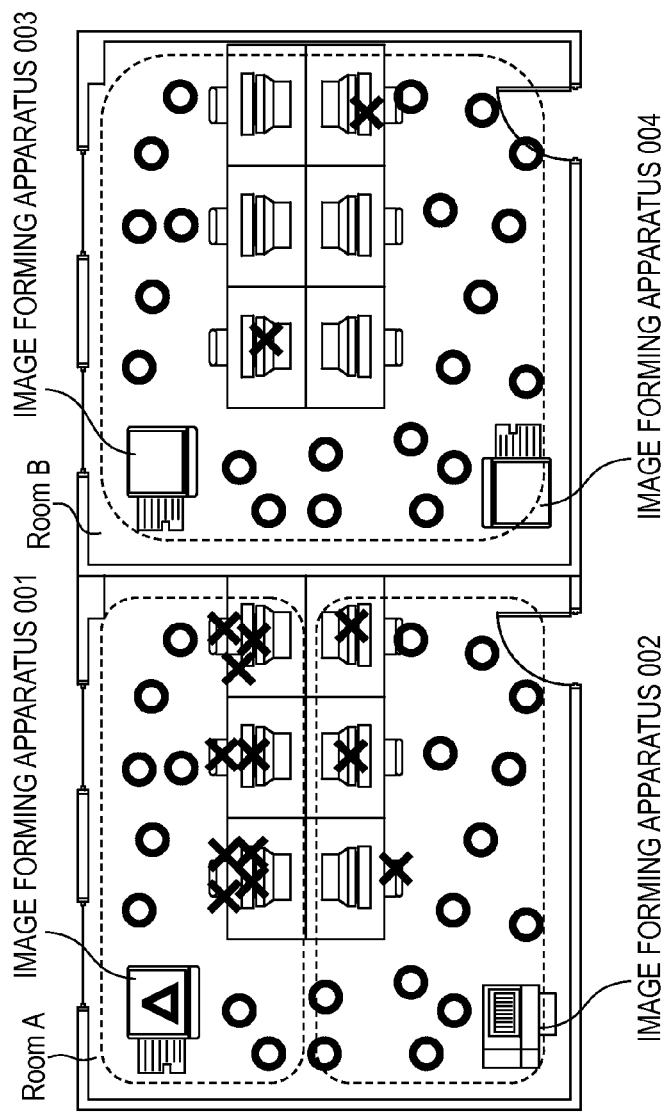

FIG. 10B schematically shows a device location and a plurality of remote access locations with focus on, for example, the image forming apparatus 001. When generating area information (FIG. 8A), the data analysis unit 305 also refers to the location information obtained from other user mobile terminal location information to comprehend the space. A space in which there are no user mobile terminal location information is recognized as an obstacle such as a wall. The data analysis unit 305 also analyzes other image forming apparatus location information and remote access locations in the same manner to segment the space into area A, area B, area C, and area D (FIG. 10A). In addition, if information indicating reliability is added to each remote access location, the data analysis unit 305 performs determination on areas in consideration of reliabilities. Referring to FIG. 10A, the respective areas are segmented in rectangular forms. However, the present invention is not limited to this. For example, circular areas including image forming apparatuses may be set.

In addition, upon determining the order of areas where the respective image forming apparatuses are frequently used, the data analysis unit 305 generates and records device usage area information like that shown in FIG. 8B. If there is device usage area information generated in the past, the data analysis unit 305 overwrites it or combines the new information with the device usage area information generated in the past to generate new device usage area information. Furthermore, it is possible to ensure a free space in the storage by deleting the device logs and user mobile terminal location information used for analysis.

When a predetermined period of time has elapsed since the previous update of device location information, the processing in steps S1111 to S1115 may be performed even if the device information includes device location information in step S1110. This makes it possible to properly manage device locations when, for example, the locations of devices having no GPS function have changed.

<Device Introduction Processing>

The device introduction service 307 of the device management server 202 returns device information in response to device information acquisition requests from the application 308, Web browser 309, and print driver 310 of the PC 203. Likewise, the device introduction service 307 returns device information in response to device information acquisition requests from the application 313 and Web browser 314 of the user mobile terminal 206. Operation to be performed when the device introduction service 307 of an image forming apparatus has received a device information acquisition request will be described with reference to the flowchart of FIG. 12. Assume that the CPU of the device management server 202 implements this processing by reading out and executing a program stored in the ROM or the like.

Upon receiving a device information acquisition request from a terminal such as a PC, the device introduction service 307 executes the subsequent processing (step S1201). The device introduction service 307 acquires the location information of the request source terminal in accordance with the device information acquisition request (step S1202). Upon succeeding in acquiring the location information of the request source terminal (YES in step S1202), the device introduction service 307 specifies a device usage location by regarding the acquired location information as a remote access location (step S1207). With this operation, the device management server 202 implements a terminal location specification unit.

Upon failing to acquire the location information (NO in step S1202), the device introduction service 307 acquires the account of the user who is logging in to the request source terminal (step S1203). Upon succeeding in acquiring the account (YES in step S1203), the device introduction service 307 acquires a user mobile terminal ID by referring to the user information (FIG. 4) (step S1204). The device introduction service 307 acquires the location information of a user mobile terminal in a closest time to the mobile terminal ID acquired by referring to the user mobile terminal location information (step S1205). Note that the closest time in this case indicates a time in a range before the current time, and is acquired as a range of several sec or less from the current time. The device introduction service 307 then determines whether user mobile terminal location information exists and could be acquired (step S1206). If user mobile terminal location information exists (YES in step S1206), the device introduction service 307 specifies a device usage location by regarding the user mobile terminal location information as a remote access location (step S1207).

The device introduction service 307 then refers to the device usage area information (FIGS. 8A and 8B) (step S1208). The device introduction service 307 selects one image forming apparatus associated with the area corresponding to the remote access location (step S1209). If, for example, the request source terminal location is in area A, the device introduction service 307 selects the image forming apparatus 001, with highest priority, with which area A is associated as the first usage area. The device introduction service 307 selects the image forming apparatus 002, with second highest priority, with which area A is associated with the second usage area.

The device introduction service 307 then acquires the detailed information of the image forming apparatus by referring to the device information (FIG. 5) (step S1210). Finally, the device introduction service 307 transmits the information of the selected image forming apparatus to the request source (step S1211). More specifically, the device introduction service 307 is configured to perform the following operations:

transmitting only the information of an image forming apparatus with high priority;

sequentially transmitting information from image forming apparatuses in descending order of priority; and transmitting the information of image forming apparatuses with information indicating priorities.

In this embodiment, if the device introduction service 307 has failed to perform any processing in steps S1202 to S1209 and could not determine any remote access location, the device introduction service 307 transmits image forming apparatus information obtained from the device information (FIG. 5) without any consideration of priority.

As has been described above, in this embodiment, if, for example, a device information acquisition request is received from area A, this device management system does not preferentially return the information of the image forming apparatus 003 beyond the wall. In addition, the device management system of this embodiment can introduce the nearest device to a user who wants to use an image forming apparatus in area A for the first time.

In addition, according to the present invention, the device management system is configured to generate device usage area information from data acquired by the system, and hence save the manager from having to generate device usage area information by himself/herself. In addition, this system is configured to use location information acquired from the user mobile terminals held by the users, and hence can generate device usage area information without any two-dimensional layout of the office or three-dimensional data of the building.

Furthermore, since this system is configured to generate device usage area information from the use records of devices, the manager can examine the relationship between the areas and device locations and can consider changes in device location. It is also possible to use generated device usage area information for a search for a device from a terminal in the area. This prevents the device management system from erroneously and preferentially introducing a device in another area. In addition, the system is configured to use the location information of the mobile terminals of the users, and hence can specify the location of a device having no function of specifying location information (for example, a GPS sensor).

Other Embodiments

The above embodiment has exemplified the device management server 202 incorporating the respective units shown in FIG. 3 within the same apparatus. However, the respective functions may be assigned to a plurality of apparatuses. In addition, the above embodiment has exemplified the GPS sensor as a unit for automatically specifying the location of each device or terminal. However, it is possible to use a sensor, other than a GPS sensor, which can specify location information. For example, it is possible to use, for example, a method of specifying location information by using PHS or wireless LAN access points.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-192033, filed Sep. 2, 2011, which is hereby incorporated by reference herein in its entirety.

What is claimed is:

1. A device management apparatus which manages a device and a terminal which remotely uses the device, the apparatus comprising:
a log acquisition unit configured to acquire a log of a plurality of jobs which have been executed by the device;
a usage location specification unit configured to specify, based on the log acquired by said log acquisition unit, locations of the terminal at the time that the device executed the plurality of jobs;
a generation unit configured to generate information of an area from where the device has been used, based on the locations of the terminal specified by said usage location specification unit;
a device location specification unit configured to specify a location of the device based on device information managed by the device management apparatus; and
a location information acquisition unit configured to periodically acquire location information of a user;
wherein said generation unit generates the information of the area from where the device has been used, based on the location of the device specified by said device location specification unit and the locations of the terminal specified by said usage location specification unit,
wherein if the device information includes no device location information, said device location specification unit specifies a user of the device based on a log of local access which has been processed by the device, acquires, based on the location information acquired by said location information acquisition unit, location information of the user at the time that the device has processed the local access, and specifies the acquired location information of the user as the location of the device, and
wherein the log of local access comprises a log provided by the device and associated with at least one of a copy service, operation associated with a document, a user authentication service accompanying use of an operation panel, and a device setting change.

2. The apparatus according to claim 1, further comprising:
a terminal location specification unit configured to specify a location of the terminal when receiving a device information request from the terminal; and
a transmission unit configured to select, based on the information of the area generated by said generation unit, device information of a device configured to be used from an area including the location of the terminal specified by said terminal location specification unit, and to transmit the selected device information to the terminal.

3. The apparatus according to claim 1,
wherein if the log includes no location information of a terminal, said usage location specification unit specifies a user of the terminal, acquires, based on the location information acquired by said location information acquisition unit, location information of the user at the time that the device has executed the plurality of jobs, and specifies the acquired location information of the user as the locations of the terminal at the time that the device has executed the plurality of jobs.

4. The apparatus according to claim 3, wherein said usage location specification unit determines, in accordance with a predefined condition, whether the acquired location information of the user is reliable, and does not use the location information if it is determined that the location information is not reliable.

5. The apparatus according to claim 4, wherein said usage location specification unit determines that the location information of the user of the device is not reliable, if the predefined condition corresponds to one of conditions that a distance between a location of a user of a device and a location of a device exceeds a threshold, a height distance between the location of the user of the device and the location of the device exceeds a threshold, there is no record indicating movement of the user of the device at a recording time of the log and in a predetermined interval before and after the recording time, and there is no record indicating that the user has approached the location of the device in a predetermined interval after remote access to the device.

6. The apparatus according to claim 3, wherein the location information of the user of the device acquired by said location information acquisition unit comprises location information transmitted from a mobile terminal held by the user.

7. The apparatus according to claim 6, wherein the location information of the user of the device is transmitted from the mobile terminal periodically or when the location of the user changes.

8. The apparatus according to claim 1, wherein said generation unit generates area information while associating devices configured to be used from the respective areas with priority levels thereof.

9. The apparatus according to claim 1, wherein the log acquisition unit acquires the log of the plurality of jobs and a log of authentication of remote access.

10. The apparatus according to claim 1, wherein said device location specification unit determines, in accordance with a predefined condition, whether the acquired location information of the user is reliable, and does not use the location information if it is determined that the location information is not reliable.

11. The apparatus according to claim 10, wherein said device location specification unit determines that the location information of the user of the device is not reliable, if the predefined condition corresponds to one of conditions that there is no record indicating movement of the user of the device at a recording time of the log and in a predetermined interval before and after the recording time, and when a distribution of the location of the user of the device is obtained from all logs of local access of the same device is obtained, a distance between a location of location information acquired by said location information acquisition unit and a barycenter of the distribution exceeds a threshold.

12. A device management method, executed by a device management apparatus, of managing a device and a terminal which remotely uses the device, the method comprising the steps of:
    acquiring a log of a plurality of jobs which have been executed by the device;
    a usage location specifying step of specifying, based on the acquired log, locations of the terminal at the time that the device has executed the plurality of jobs;
    generating information of an area from where the device has been used, based on the locations of the terminal specified in the usage location specifying step;
    a device location specification step of specifying a location of the device based on device information managed by the device management apparatus; and
    a location information acquisition step of periodically acquiring location information of a user,
    wherein said generating step generates the information of the area from where the device has been used, based on the location of the device specified by said device location specification step and the locations of the terminal specified by said usage location specifying step,
    wherein if the device information includes no device location information, said device location specification step specifies a user of the device based on a log of local access which has been processed by the device, acquires, based on the location information acquired by said location information acquisition step, location information of the user at the time that the device has processed the local access, and specifies the acquired location information of the user as the location of the device, and
    wherein the log of local access comprises a log provided by the device and associated with at least one of a copy service, operation associated with a document, a user authentication service accompanying use of an operation panel, and a device setting change.

13. A non-transitory computer-readable medium storing a program for causing a computer to function as a device management apparatus which manages a device and a terminal which remotely uses the device, the program comprising:
    code for a log acquisition step of acquiring a log of a plurality of jobs which have been executed by the device;
    code for a usage location specification step of specifying, based on the log acquired by said log acquisition step, locations of the terminal at the time that the device has executed the plurality of jobs;
    code for a generation step of generating information of an area from where the device has been used, based on the locations of the terminal specified by the usage location specification step;
    code for a device location specification step of specifying a location of the device based on device information managed by the device management apparatus; and
    code for a location information acquisition step of periodically acquiring location information of a user,
    wherein said generating step generates the information of the area from where the device has been used, based on the location of the device specified by said device location specification step and the locations of the terminal specified by said usage location specification step,
    wherein if the device information includes no device location information, said device location specification step specifies a user of the device based on a log of local access which has been processed by the device, acquires, based on the location information acquired by said location information acquisition step, location information of the user at the time that the device has processed the local access, and specifies the acquired location information of the user as the location of the device, and
    wherein the log of local access comprises a log provided by the device and associated with at least one of a copy service, operation associated with a document, a user authentication service accompanying use of an operation panel, and a device setting change.

* * * * *